United States Patent
Niesen et al.

(10) Patent No.: US 12,141,991 B2
(45) Date of Patent: *Nov. 12, 2024

(54) RADAR-AIDED SINGLE IMAGE THREE-DIMENSIONAL DEPTH RECONSTRUCTION

(71) Applicant: QUALCOMM Incorporated, San Diego, CA (US)

(72) Inventors: Urs Niesen, Berkeley Heights, NJ (US); Jayakrishnan Unnikrishnan, Bellevue, WA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/678,955

(22) Filed: Feb. 23, 2022

(65) Prior Publication Data
US 2022/0180537 A1 Jun. 9, 2022

Related U.S. Application Data

(63) Continuation of application No. 16/809,348, filed on Mar. 4, 2020, now Pat. No. 11,276,189.
(Continued)

(51) Int. Cl.
*G06T 7/50* (2017.01)
*G01S 17/89* (2020.01)
*G06N 3/045* (2023.01)

(52) U.S. Cl.
CPC .............. *G06T 7/50* (2017.01); *G01S 17/89* (2013.01); *G06N 3/045* (2023.01);
(Continued)

(58) Field of Classification Search
None
See application file for complete search history.

(56) References Cited

U.S. PATENT DOCUMENTS 10,430,641 B2 * 10/2019 Gao ..................... G06V 20/647
10,503,174 B1 * 12/2019 Kim ....................... G06T 7/521
(Continued)

FOREIGN PATENT DOCUMENTS

CN 105701449 A 6/2016
CN 108663677 A 10/2018
(Continued)

OTHER PUBLICATIONS

Taiwan Search Report—TW109107323—TIPO—Sep. 7, 2023.
(Continued)

*Primary Examiner* — Anand P Bhatnagar
(74) *Attorney, Agent, or Firm* — QUALCOMM Incorporated

(57) ABSTRACT

Disclosed are techniques for radar-aided single-image three-dimensional (3D) depth reconstruction. In an aspect, at least one processor of an on-board computer of an ego vehicle receives, from a radar sensor of the ego vehicle, at least one radar image of an environment of the ego vehicle, receives, from a camera sensor of the ego vehicle, at least one camera image of the environment of the ego vehicle, receives, from a light detection and ranging (LiDAR) sensor of the ego vehicle, at least one LiDAR image of the environment of the ego vehicle, and generates a depth image of the environment of the ego vehicle based on the at least one radar image, the at least one LiDAR image, and the at least one camera image.

16 Claims, 10 Drawing Sheets

Related U.S. Application Data

(60) Provisional application No. 62/814,658, filed on Mar. 6, 2019.

(52) U.S. Cl.
CPC .............. *G06T 2207/10012* (2013.01); *G06T 2207/10028* (2013.01); *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 10,611,307 B2* | 4/2020 | Liebau | G01C 15/002 |
| 10,767,997 B1* | 9/2020 | Gorur Sheshagiri | G06V 10/80 |
| 10,769,793 B2* | 9/2020 | Chen | B60W 40/11 |
| 11,391,819 B2* | 7/2022 | Sarkis | G01S 7/417 |
| 11,393,097 B2* | 7/2022 | Brunner | G06T 7/20 |
| 2018/0082137 A1* | 3/2018 | Melvin | G01S 7/417 |
| 2018/0260613 A1* | 9/2018 | Gao | H04N 23/00 |
| 2019/0004533 A1* | 1/2019 | Huang | G01S 17/86 |
| 2019/0026588 A1 | 1/2019 | Ryan | |
| 2019/0180467 A1* | 6/2019 | Li | G01S 17/93 |
| 2019/0206124 A1 | 7/2019 | Zhou et al. | |
| 2019/0340775 A1 | 11/2019 | Lee et al. | |
| 2020/0286247 A1 | 9/2020 | Niesen | |

FOREIGN PATENT DOCUMENTS

| | | |
|---|---|---|
| CN | 108759667 A | 11/2018 |
| CN | 109146929 A | 1/2019 |
| CN | 109212543 A | 1/2019 |
| EP | 3438872 A1 | 2/2019 |

OTHER PUBLICATIONS

International Search Report and Written Opinion—PCT/US2020/021280—ISA/EPO—Jun. 29, 2020.

Niesen U., et al., "Radar-Aided Single-Image 3-D Depth Reconstruction", Qualcomm Flarion Technologies, Bridgewater, NJ, 10 Pages.

Schlosser J., et al., "Fusing LI DAR and Images for Pedestrian Detection Using Convolutional Neural Networks", 2016 IEEE International Conference on Rootics and Automation (ICRA), IEEE, May 16, 2016 (May 16, 2016), pp. 2198-2205, XP032908393, DOI: 10.1109/ICRA.2016.7487370 [retrieved on Jun. 8, 2016] the whole document.

* cited by examiner (a)

(b)

RADAR-AIDED SINGLE IMAGE THREE-DIMENSIONAL DEPTH RECONSTRUCTION

CROSS-REFERENCE TO RELATED APPLICATIONS

The present Application for Patent is a continuation of U.S. patent application Ser. No. 16/809,348, entitled "RADAR-AIDED SINGLE IMAGE THREE-DIMENSIONAL DEPTH RECONSTRUCTION," filed Mar. 4, 2020, which claims priority to U.S. Provisional Application No. 62/814,658, entitled "RADAR-AIDED SINGLE IMAGE THREE-DIMENSIONAL DEPTH RECONSTRUCTION," filed Mar. 6, 2019, both of which are assigned to the assignee hereof, and expressly incorporated herein by reference in their entireties.

BACKGROUND OF THE DISCLOSURE

1. Technical Field

Aspects of this disclosure relate generally to autonomous or semi-autonomous driving techniques.

2. Description of the Related Art

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of radar-aided single-image three-dimensional (3D) depth reconstruction performed by at least one processor of an on-board computer of an ego vehicle includes receiving, from a radar sensor of the ego vehicle, at least one radar image of an environment of the ego vehicle; receiving, from a camera sensor of the ego vehicle, at least one camera image of the environment of the ego vehicle; receiving, from a light detection and ranging (LiDAR) sensor of the ego vehicle, at least one LiDAR image of the environment of the ego vehicle, wherein the at least one LiDAR image represents range measurements of laser signals emitted by the LiDAR sensor; and generating a depth image of the environment of the ego vehicle based on the at least one radar image, the at least one LiDAR image, and the at least one camera image.

In an aspect, an on-board computer of an ego vehicle includes a memory; and at least one processor communicatively coupled to the memory, the at least one processor configured to: receive, from a radar sensor of the ego vehicle, at least one radar image of an environment of the ego vehicle; receive, from a camera sensor of the ego vehicle, at least one camera image of the environment of the ego vehicle; receive, from a light detection and ranging (LiDAR) sensor of the ego vehicle, at least one LiDAR image of the environment of the ego vehicle, wherein the at least one LiDAR image represents range measurements of laser signals emitted by the LiDAR sensor; and generate a depth image of the environment of the ego vehicle based on the at least one radar image, the at least one LiDAR image, and the at least one camera image.

In an aspect, a non-transitory computer-readable medium storing computer-executable instructions for radar-aided single-image three-dimensional (3D) depth reconstruction includes at least one instruction instructing at least one processor of an on-board computer of an ego vehicle to receive, from a radar sensor of the ego vehicle, at least one radar image of an environment of the ego vehicle; at least one instruction instructing the at least one processor to receive, from a camera sensor of the ego vehicle, at least one camera image of the environment of the ego vehicle; at least one instruction instructing the at least one processor to receive, from a light detection and ranging (LiDAR) sensor of the ego vehicle, at least one LiDAR image of the environment of the ego vehicle, wherein the at least one LiDAR image represents range measurements of laser signals emitted by the LiDAR sensor; and at least one instruction instructing the at least one processor to generate a depth image of the environment of the ego vehicle based on the at least one radar image, the at least one LiDAR image, and the at least one camera image.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
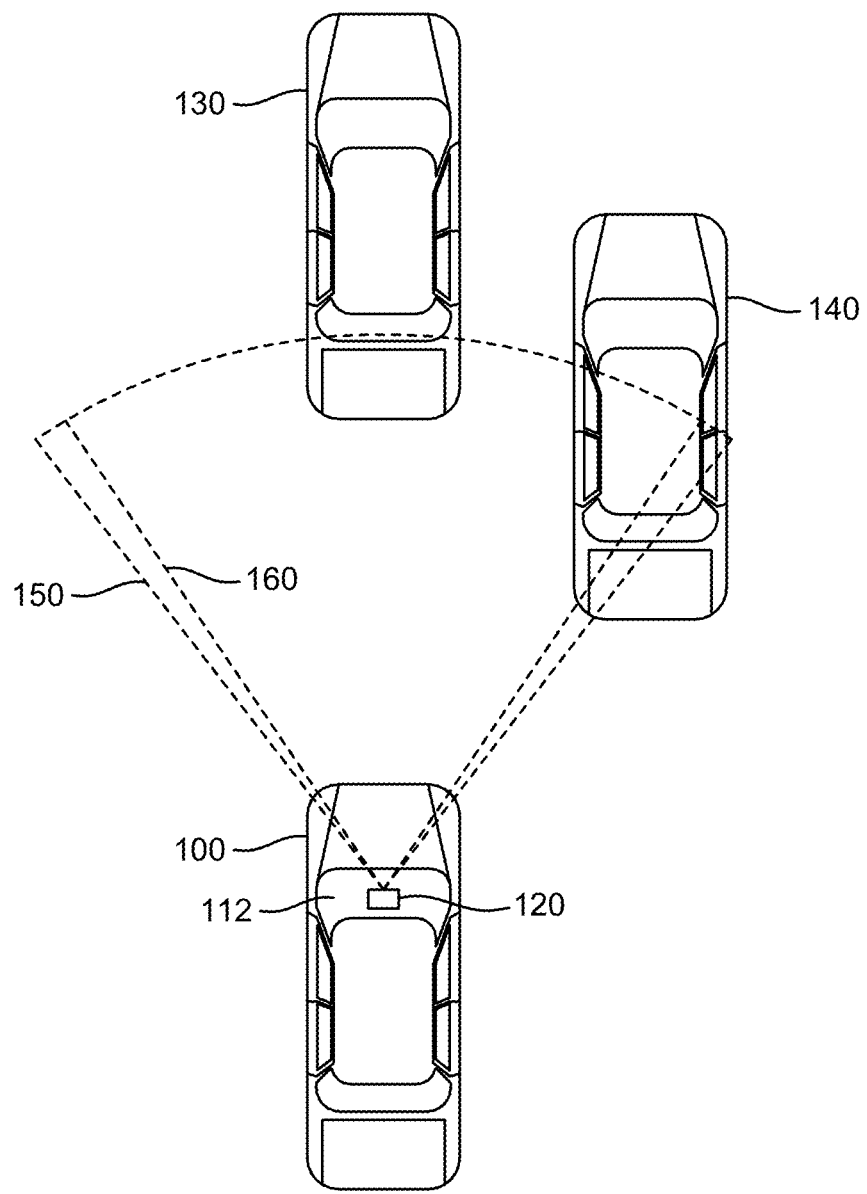
FIG. 1 is a top view of a vehicle employing an integrated radar-camera sensor behind the windshield, according to various aspects of the disclosure.

This disclosure provides techniques for applying 3D depth reconstruction to autonomous driving. In this context, access to both front-facing camera and radar sensors can be expected. These two sensors are complementary in several respects: the camera is a passive sensor measuring azimuth and elevation, while the radar is an active sensor measuring azimuth and range. In this disclosure, the camera's and radar's complementary characteristics are used by fusing their measurements.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (referred to as an "ego vehicle" or a "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters (attributes) of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
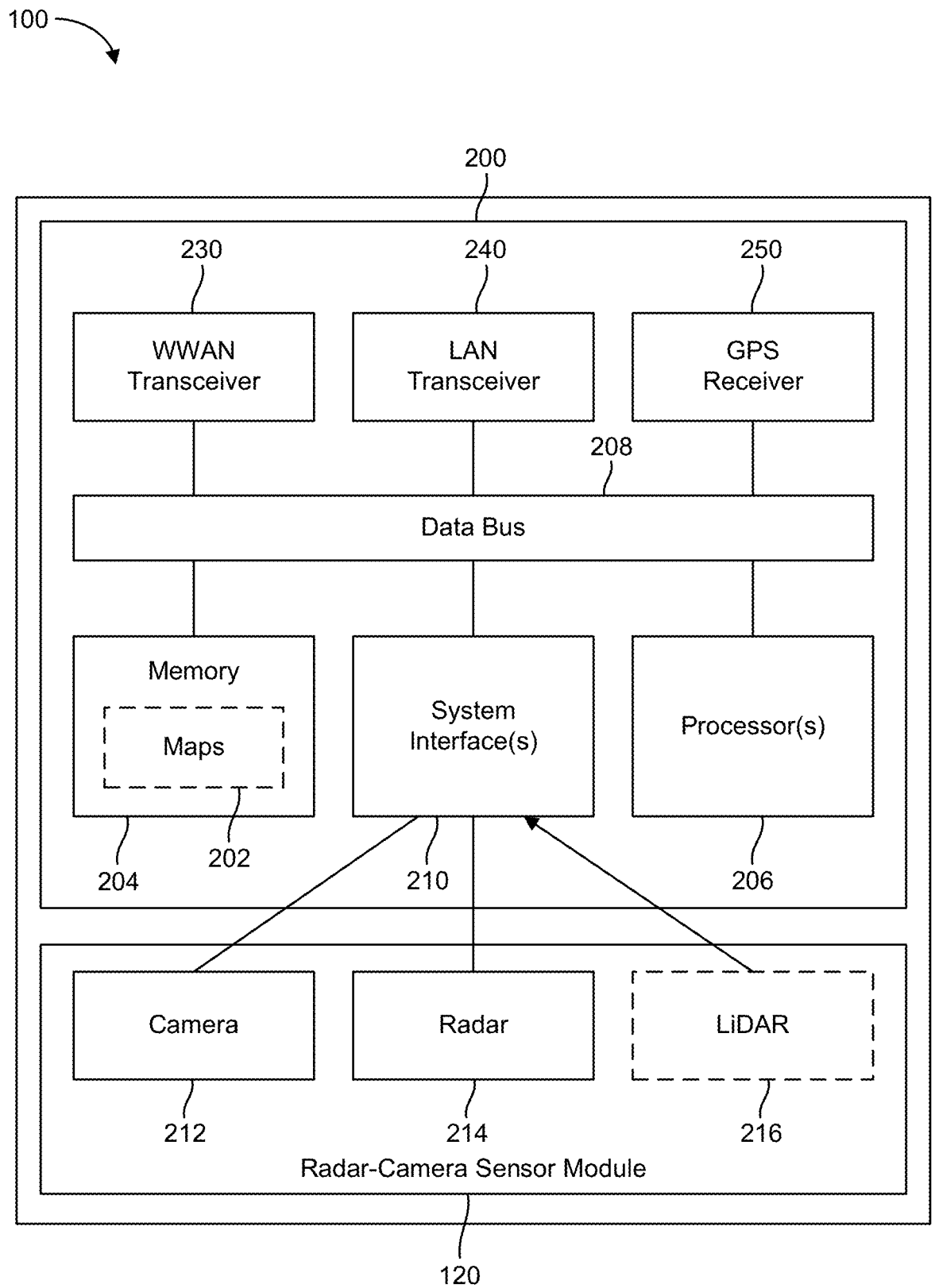
FIG. 2 illustrates an on-board computer architecture, according to various aspects of the disclosure.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as a New Radio (NR) network, a Long-Term Evolution (LTE) network, a Global System for Mobile Communication (GSM) network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated radio access technology (RAT) (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
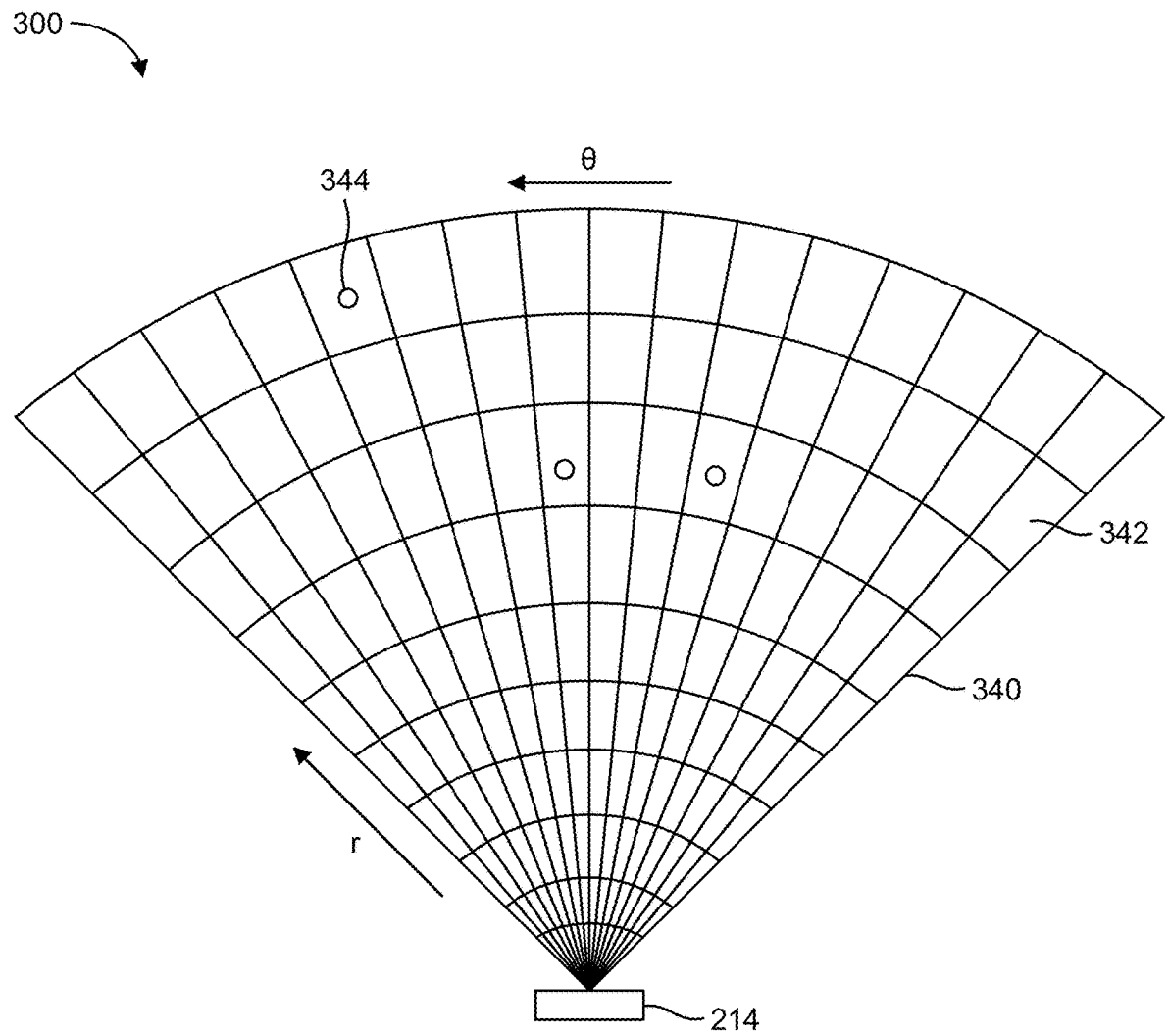
FIG. 3 is a schematic of a sensed occupancy radar grid, according to various aspects of the disclosure.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned responses (which may also be referred to as "pings") measured by the radar 214 is characterized as an observation (or occupancy) grid 340 having a plurality of observation cells 342. Each cell 342 represents the measured returned response value at a specific range (r) and angle/azimuth ($\theta$). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 may generate two-dimensional (2D), three-dimensional (3D), or four dimensional (4D) tensors for features 344 within cells 342 of the observation grid 340 detected by the radar 214. Specifically, a 2D tensor represents the range (distance from the vehicle 100 to the detected feature 344) and azimuth (the horizontal distance between a feature 344 and a reference RF ray emitted by the radar 214, such as the initial RF ray of a radar sweep) of each detected feature 344. A 3D tensor represents the range, azimuth, and Doppler (indicating the speed of the detected feature 344) or elevation (vertical direction from the radar 214 to the detected feature) of each detected feature 344. A 4D tensor represents all four quantities. The processor(s) 206 then performs object detection, object classification, localization, and property/attribute estimation based on the tensors and undistorted camera frames received from the camera 212.

Note that conventional automotive radars generally only provide range and azimuth measurements (2D tensors); they do not provide elevation information (3D tensors). In addition, Doppler information is usually integrated out, meaning it may be measured but is then removed. However, it may also not be measured at all. As such, the description of the techniques disclosed herein assume that only range and azimuth information is obtained from the radar sensor (e.g., radar 214).

In contrast to images (e.g., from camera 212), radar signals (e.g., from radar 214) have several unique characteristics. One example is specular reflections, in which only certain surfaces on the target having an advantageous orientation reflect the radar signal, which often results in a small number of reflections.

Figure 4:
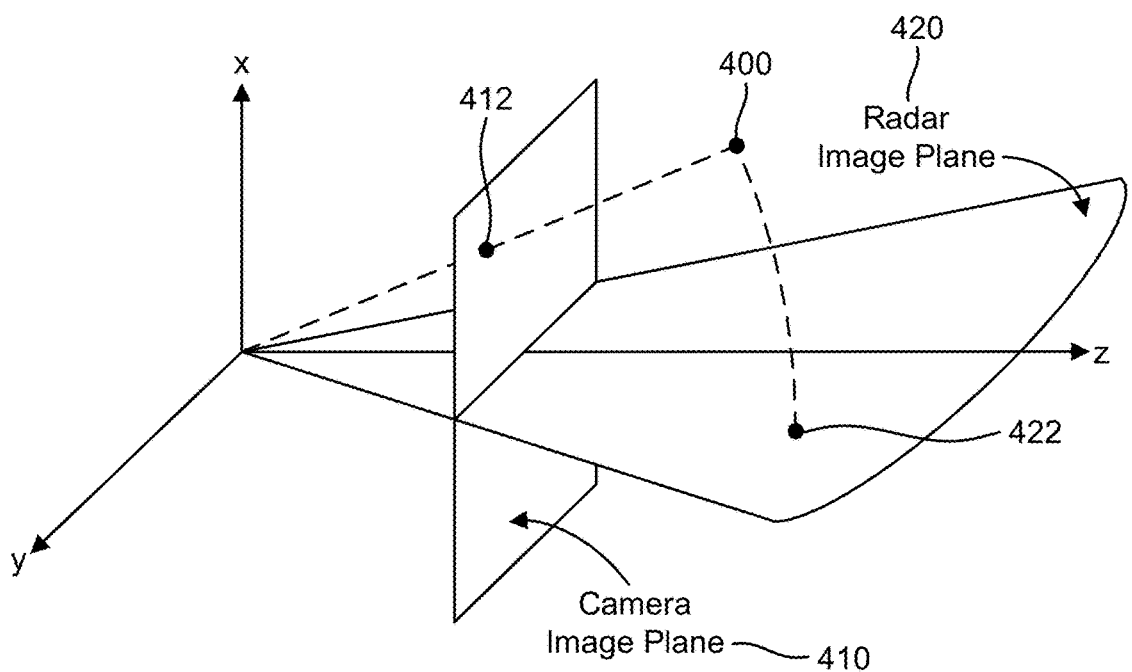
FIG. 4 is a diagram illustrating a camera image plane and a radar image plane, according to aspects of the disclosure.

FIG. 4 is a diagram illustrating a camera image plane 410 and a radar image plane 420, according to aspects of the disclosure. Camera image formation maps a point 400 with Cartesian coordinates (x, y, z) into the point 412 (x/z, y/z) on the camera image plane 410. This so-called perspective projection removes all depth information. Radar image formation maps the point 400 with spherical coordinates, i.e., range, azimuth, and elevation ($\rho$, $\theta$, $\Phi$), into the point 422 with polar coordinates ($\rho$, $\theta$) on the radar image plane 420. This spherical-to-polar projection removes all elevation information. Thus, at a high level, the camera 212 and radar sensor 214 measure projections of the 3D scene onto different 2D planes (vertical for camera and horizontal for radar).

Single-image depth reconstruction is an important problem in computer vision. It has applications in scene understanding, robotics, and 3D reconstruction. In autonomous driving, depth reconstruction can be used to aid in sensor fusion, drivable space detection, and navigation.

As discussed above with reference to FIG. 3, a radar sensor (e.g., radar sensor 214) is an active sensor (insofar as it transmits and receives RF signals) that measures range and azimuth. However, the radar sensor does not output elevation information. Rather, as discussed above, the resulting radar image represents a target point (e.g., point 400) in polar coordinates ($\rho$, $\theta$). This characteristic makes the radar sensor complementary to the camera (e.g., camera 212), which is a passive sensor (insofar as it simply captures light rays and transforms them into an image) that measures azimuth and elevation (e.g., as a point 412 (x/z, y/z)), but does not measure range. From the complementary nature of the camera and radar sensors, there is a clear benefit of fusing their measurements for depth reconstruction.

However, radar-aided single-image 3D depth reconstruction remains ill posed, since both sensors provide only 2D projections of a 3D scene, as discussed above with reference to FIG. 4. For front-facing sensors, the camera image yields a vertical projection, whereas the radar image yields a horizontal projection, as illustrated in FIG. 4.

To understand the complementary nature of the camera and radar sensors, it is beneficial to consider their respective image formation processes. For ease of presentation, the following description is restricted to a simplified and somewhat stylized description. Specifically, an ideal camera model is assumed with unit focal length, and similarly, an ideal noiseless radar sensor is assumed. These assumptions are relaxed later in this disclosure, where real camera and radar images are considered.

As discussed above with reference to FIG. 4, camera image formation maps a point with Cartesian coordinates (x, y, z) into the point (x/z, y/z) on the camera image plane. This perspective projection removes all depth information. Radar image formation maps a point with spherical coordinates ($\rho$, $\theta$, $\Phi$) into the point with polar coordinates ($\rho$, $\theta$) on the radar image plane. This spherical-to-polar projection removes all elevation information. Thus, at a high level, the camera and radar sensors measure projections of a 3D scene onto different 2D planes.

Figure 5:
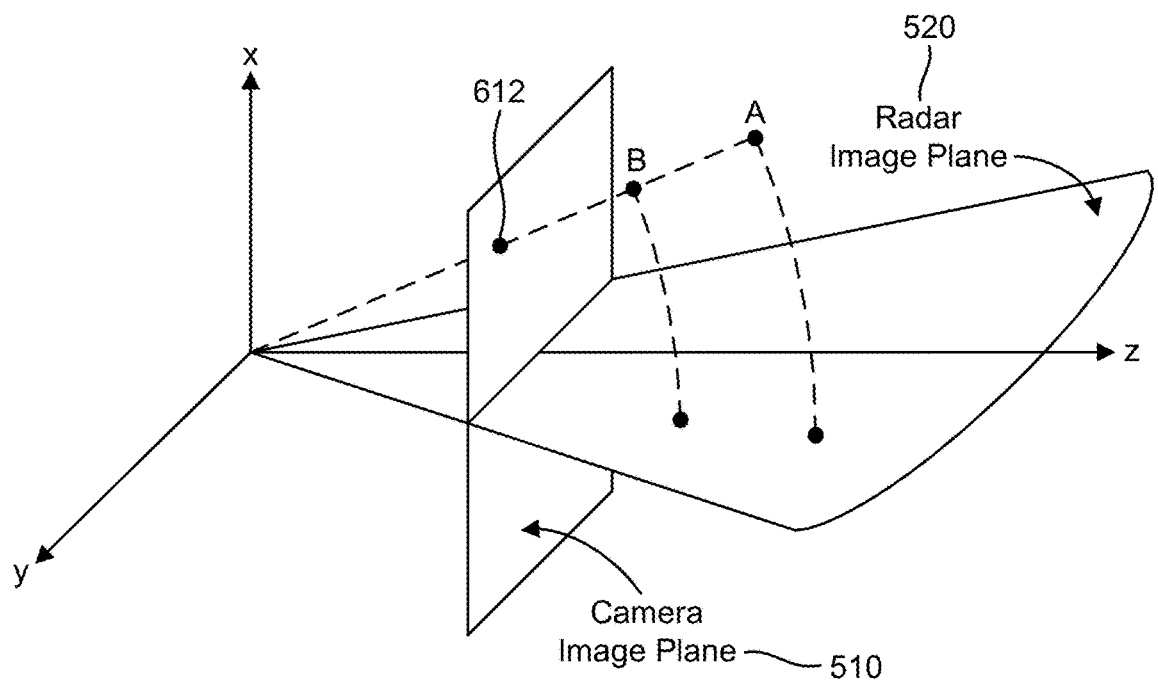
FIG. 5 illustrates the scale ambiguity problem of camera images and radar images of the same scene.

The complementary nature of the camera and radar sensors means that fusing them can remove some of the inherent ambiguity in the problem of monocular depth reconstruction. An important one of these is the well-known scale ambiguity problem depicted in FIG. 5, where the different sized (scaled) objects A and B result in identical projections 512 onto the camera image plane 510. The radar sensor does not suffer from this scale ambiguity. This is again depicted in FIG. 5, which shows that the two objects A and B have easily distinguished projections onto the radar image plane 520. Thus, fusing camera and radar sensors entirely eliminates the problem of scale ambiguity.

Figure 6:
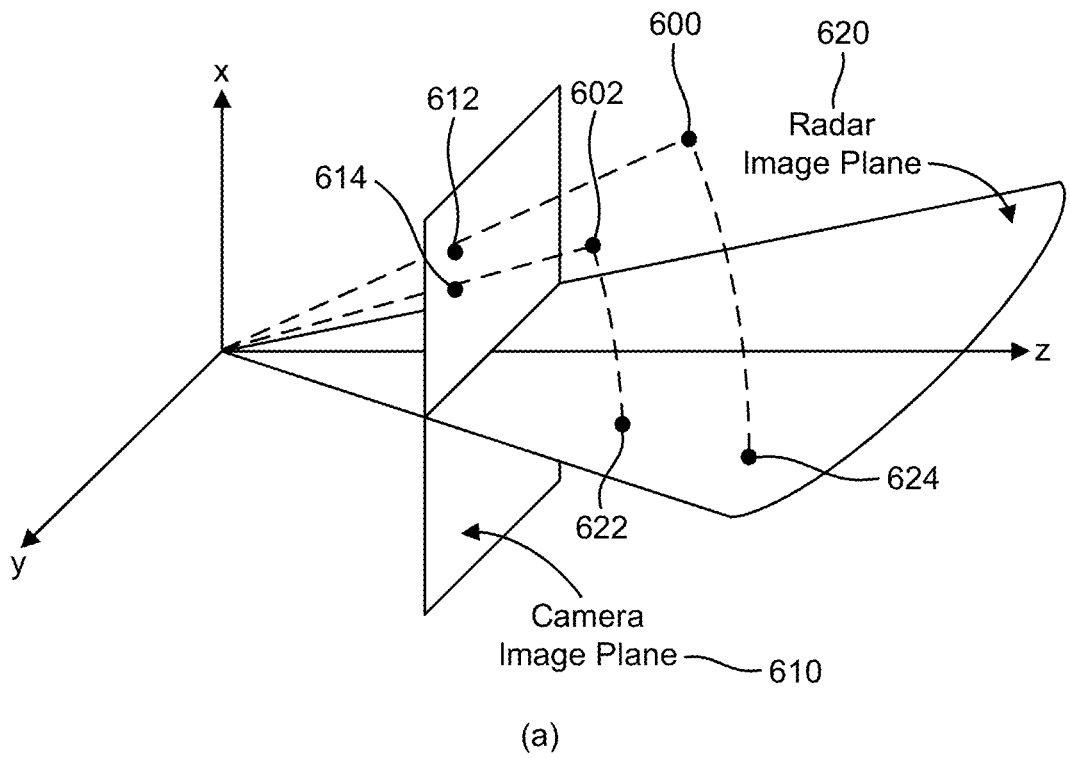
FIG. 6 illustrates two different 3D scenes yielding the same camera and radar images.
Figure 6:
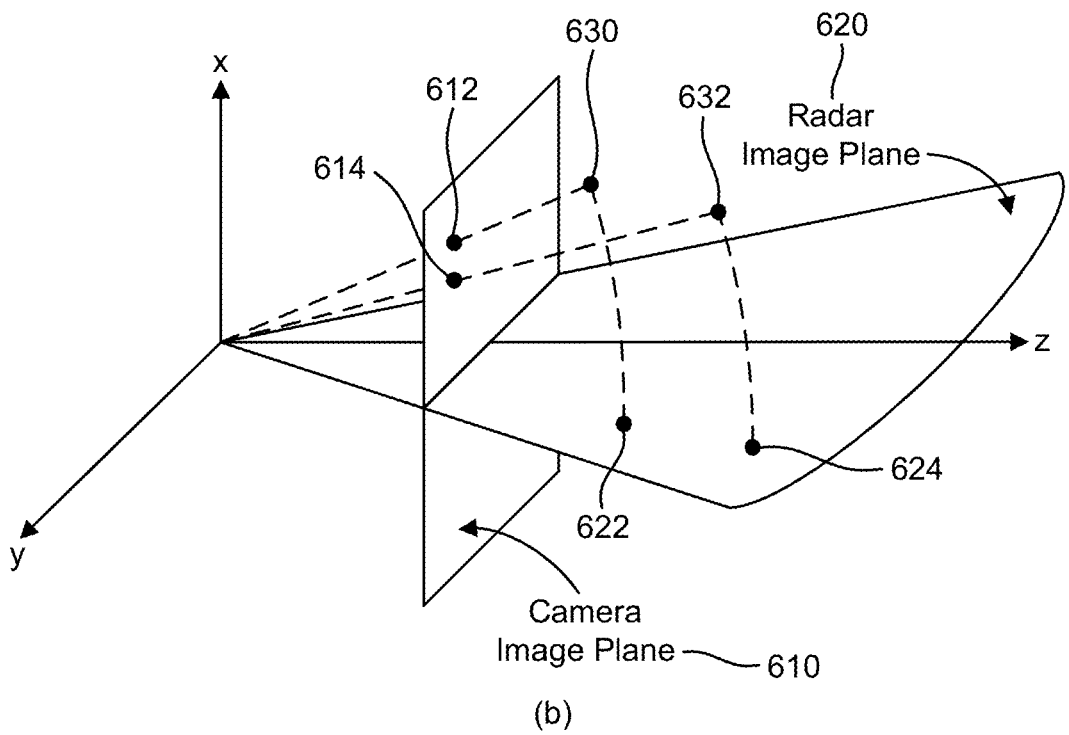

Unfortunately, even when using both the camera and radar sensors, the 3D depth reconstruction problem remains in general ambiguous and ill posed. For example, FIG. 6 illustrates two distinct 3D scenes (a) and (b), each with two objects (600 and 602 in scene (a) and 630 and 632 in scene (b)) in the scenes. These two distinct scenes yield identical camera projections 612 and 614 and radar projections 622 and 624 on the camera image plane 610 and the radar image plane 620, respectively. Thus, from the camera and radar projections alone, the corresponding 3D scene cannot be uniquely determined. This indicates that the radar-aided single-image 3D depth reconstruction problem remains challenging, and complex global prior information is needed to solve it.

Note that the foregoing description of the radar sensor has ignored the non-ideal effects of the radar antenna beam pattern, which limits the sensor resolution, particularly in the azimuth direction. This limited resolution results in significant azimuthal "smearing" in the radar image, rendering the correct association of points on the image plane and points on the radar plane with a single 3D object even more difficult.

Figure 7:
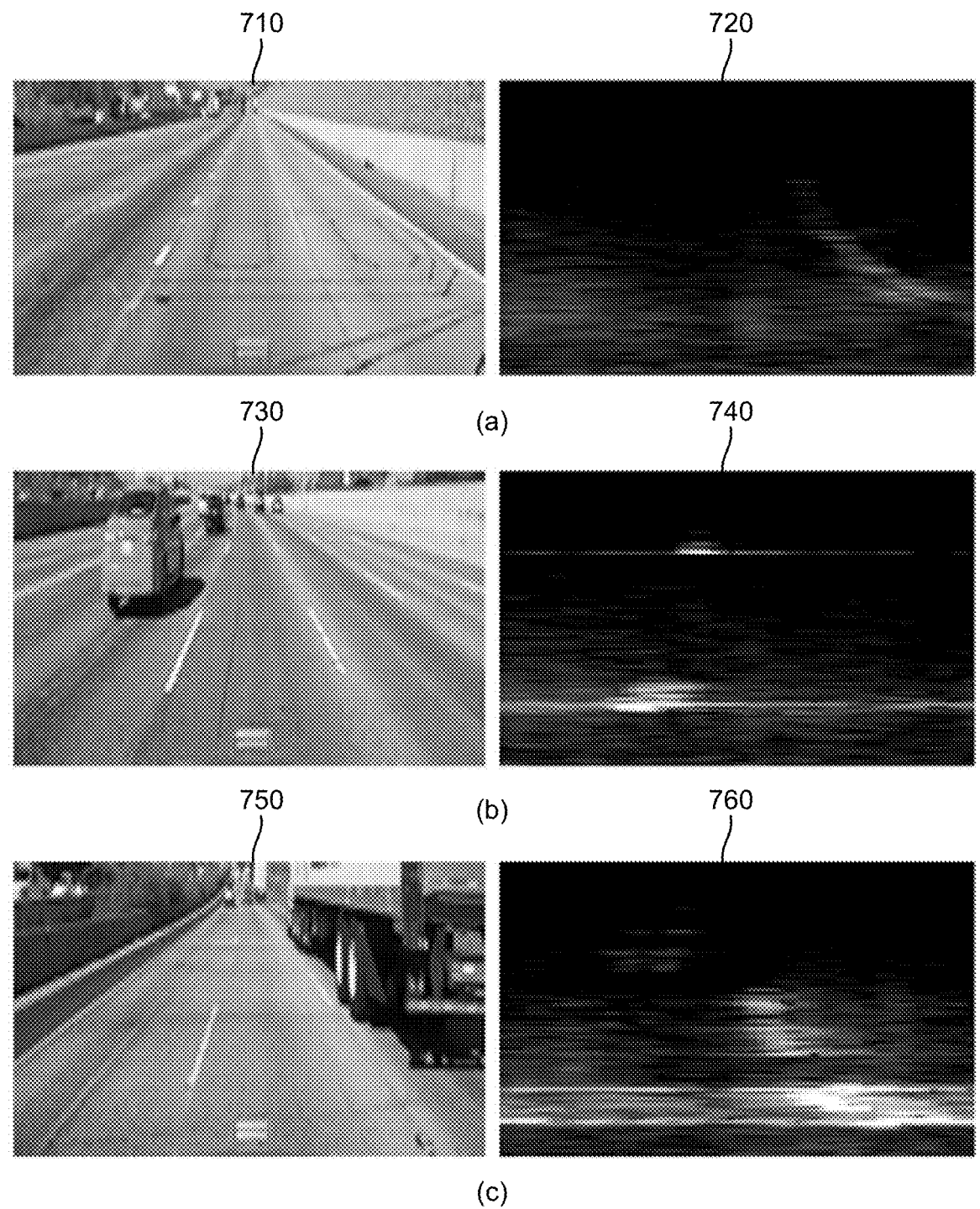
FIG. 7 illustrates several examples of corresponding camera and radar images.

Several examples of corresponding camera and radar images shown in FIG. 7 illustrate this difficulty. In FIG. 7, camera images are on the left and the corresponding radar images are on the right. In each pair of images, the x-axis represents azimuth with a field of view of 90 degrees. For the radar images, the y-axis represents range starting at 0 meters (m) at the bottom and ending at 40 m at the top. The radar images depict radar return intensities in decibels (dB).

FIG. 7(a) shows a camera image 710 of an empty road flanked on the right by a concrete guard rail. The radar signature of the guard rail is faintly visible as a curved blurry line in the lower-right quadrant of the radar image 720. FIG. 7(b) shows a camera image 730 of two cars at a distance of approximately 10 m and 30 m, respectively. The radar signature of the farther car is visible as a bright horizontal line in the upper part of the radar image 740. The radar signature of the closer car is visible as a white blob and a blurry horizontal line in the lower part of the radar image 740. This clearly illustrates the aforementioned "smearing" effect due to the radar sensor's limited azimuthal resolution. FIG. 7(c) shows a camera image 750 of a large truck at close range. The corresponding radar signature occupies most of the lower part of the radar image 760.

The techniques of the present disclosure use a deep CNN to perform the task of fusing the camera and radar images into a 3D depth reconstruction (represented as a depth image). A CNN is a class of deep neural networks, most commonly used for analyzing visual imagery. A CNN uses a variation of multilayer perceptrons (a class of feedforward artificial neural networks, consisting of at least an input layer, a hidden layer, and an output layer) designed to require minimal preprocessing (e.g., cleaning, instance selection, normalization, transformation, feature extraction and selection, etc.) of the raw input data to generate the final training set. This means that a CNN learns the filters that in traditional algorithms were hand-engineered. This independence from prior knowledge and human effort in feature design is a major advantage of CNNs.

The proposed CNN uses a modified encoder-decoder network architecture, consisting of two separate camera and radar branches, whose outputs are combined in a fusion encoder branch, followed by a decoder branch producing the final depth image. The CNN can be trained with pairs of camera and radar image collected in highway environments. The CNN is trained to fuse the camera and radar images, and also to incorporate prior knowledge about highway environments, such as knowledge of what a highway scene looks like from the perspective of the ego vehicle, such as the likely locations of signs, guide rails, other vehicles, etc. During training, ground truth information can be obtained from a LiDAR sensor (e.g., LiDAR sensor 216).

Radar-aiding for single-image depth reconstruction provides a number of advantages. For example, radar-aiding improves depth reconstruction quality. As another example, radar-aiding improves the robustness of the reconstruction, since the camera and radar sensors have different failure modes. More specifically, as noted above, the camera is affected by lighting conditions (e.g., shadows, rain, glare, darkness, etc.) while the radar sensor, being an active sensor, is unaffected by lighting conditions.

Figure 8:
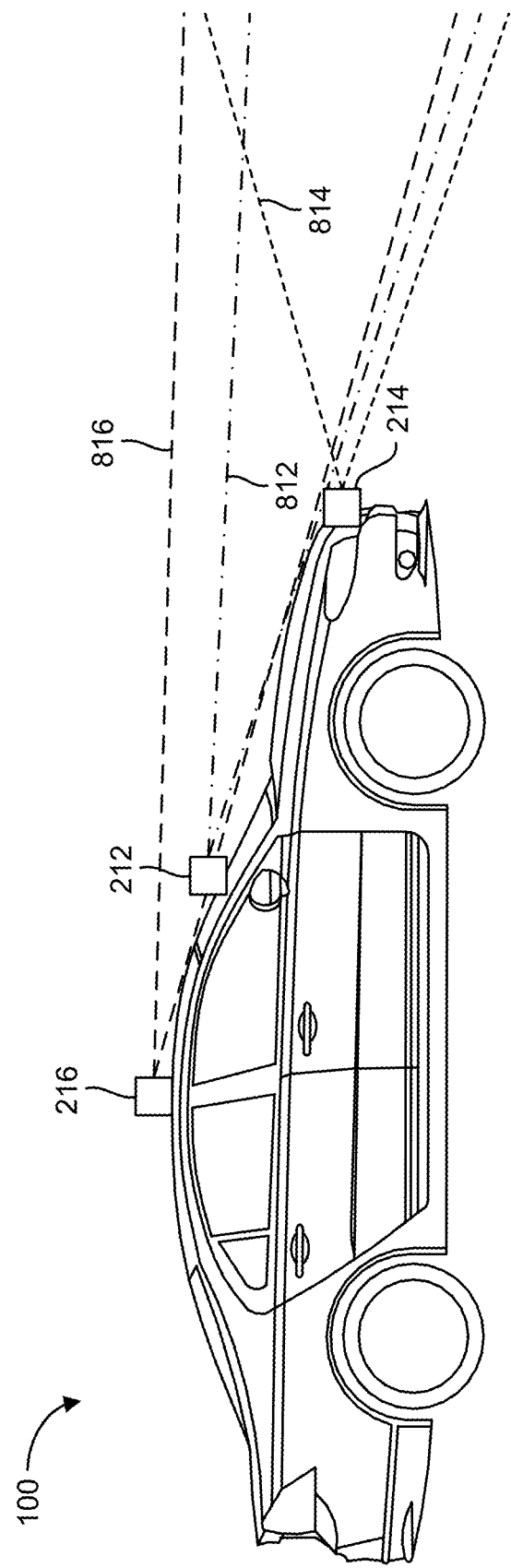
FIG. 8 illustrates the example mounting positions of a camera, a radar sensor, and a Light Detection and Ranging (LiDAR) sensor on the vehicle.

The techniques of the present disclosure utilize up to three sensors: a camera sensor (e.g., camera 212) and a radar sensor (e.g., radar 214) as the input sensors, and optionally a LiDAR sensor (e.g., LiDAR sensor 216) as the ground truth depth sensor. FIG. 8 illustrates exemplary mounting positions of a camera 212, a radar 214, and a LiDAR sensor 216 on an ego vehicle 100. The camera 212 may be an automotive-grade camera with an 800 by 1280 pixel resolution, for example. As disclosed above with reference to FIG. 1 and illustrated in FIG. 8, the camera 212 may be mounted behind the front windshield of the vehicle 100. The radar 214 may be an automotive radar, such as a RadarLog® from INRAS®, operating in the 77 gigahertz (GHz) frequency band, for example. As disclosed above with reference to FIG. 1 and illustrated in FIG. 8, the radar 214 may be mounted on the front of the vehicle 100 (e.g., in the grill or front bumper). The LiDAR sensor 216 may be mounted on the roof of the vehicle 100, and may be, for example, a Velodyne® 32-laser LiDAR.

FIG. 8 also shows each sensor's elevation field of view after preprocessing (described further below). Specifically, the elevation field of views of the camera 212 and the radar sensor 214 (the input sensors) are indicated by reference numbers 812 and 814, respectively, and the elevation field of view of the LiDAR sensor 216 (the ground truth sensor) is indicated by reference number 816. The frame rates of the three sensors may be, for example, 30 hertz (Hz) for the camera 212, 125 Hz for the radar 214, and 10 Hz for the LiDAR sensor 216. During training, each LiDAR frame is matched to the nearest camera and radar frames, and during operation, each camera image is matched to the nearest radar frame.

At an initial stage, some basic preprocessing is performed on each of the sensors' measurements in order to approximately align their fields of view (illustrated in FIG. 8), and to convert the data into the appropriate form for neural network processing. Note that, as shown in FIG. 8, the sensors need not be collocated, and as described above, need not be synchronized or calibrated with each other. Rather, each LiDAR frame is matched to the nearest camera and radar frames during training of the CNN, and each camera image is matched to the nearest radar frame after training.

The camera image is undistorted (i.e., any distortions are removed) and then cropped to a region spanning, for example, 90 degrees in elevation and 20 degrees in azimuth.

It is then centered (e.g., manually) to align with the corresponding LiDAR image to be reconstructed. The cropped image is then resized to, for example, 64 by 256 pixels.

Standard radar signal processing techniques (see, e.g., M. A. Richards, "Fundamentals of Radar Signal Processing," McGraw-Hill, second ed., 2014) can be used to create a 512 by 64 image of radar return intensities with the horizontal axis representing azimuth and the vertical axis representing range. The intensities are expressed in dB scale and clipped to restrict dynamic range to, for example, 40 dB.

Of the total number of LiDAR lasers (e.g., 32), only the data from the central ones is kept (e.g., the central 16 lasers). The other lasers typically point above the horizon or towards the hood of the vehicle and hence do not provide significant information about the traffic around the ego vehicle (e.g., vehicle 100). The LiDAR measurements may be further restricted to within ±45 degrees around the forward direction to discard data from outside the field of view of the radar 214.

The azimuth axis is then quantized into uniformly spaced bins (e.g., 64 bins of width 1.4 degrees). The depth value of a bin is computed as the average range measurement of all LiDAR returns falling in that bin. This process produces a depth image (e.g., of dimension 16 by 64). Some bins may contain no LiDAR returns (due to the lack of reflective targets in that direction). The depth for such bins is attempted to be imputed by interpolating from neighboring bins at the same elevation. If that method fails, the depth value of the bin is set to the maximum value of 40 m, assuming that there was no reflector in that direction.

The LiDAR depth image has a high dynamic range as the lower laser rays travel a short distance to the ground immediately in front of the vehicle, while higher lasers could point to far away targets. This dynamic range can be reduced by subtracting the distance from the known LiDAR sensor to an assumed flat ground plane. The resulting ground-depth subtracted depth image can be used as the ground truth in training the network and in visualizing the results. This helps local variations in depth stand out in the depth image.

Figure 9:
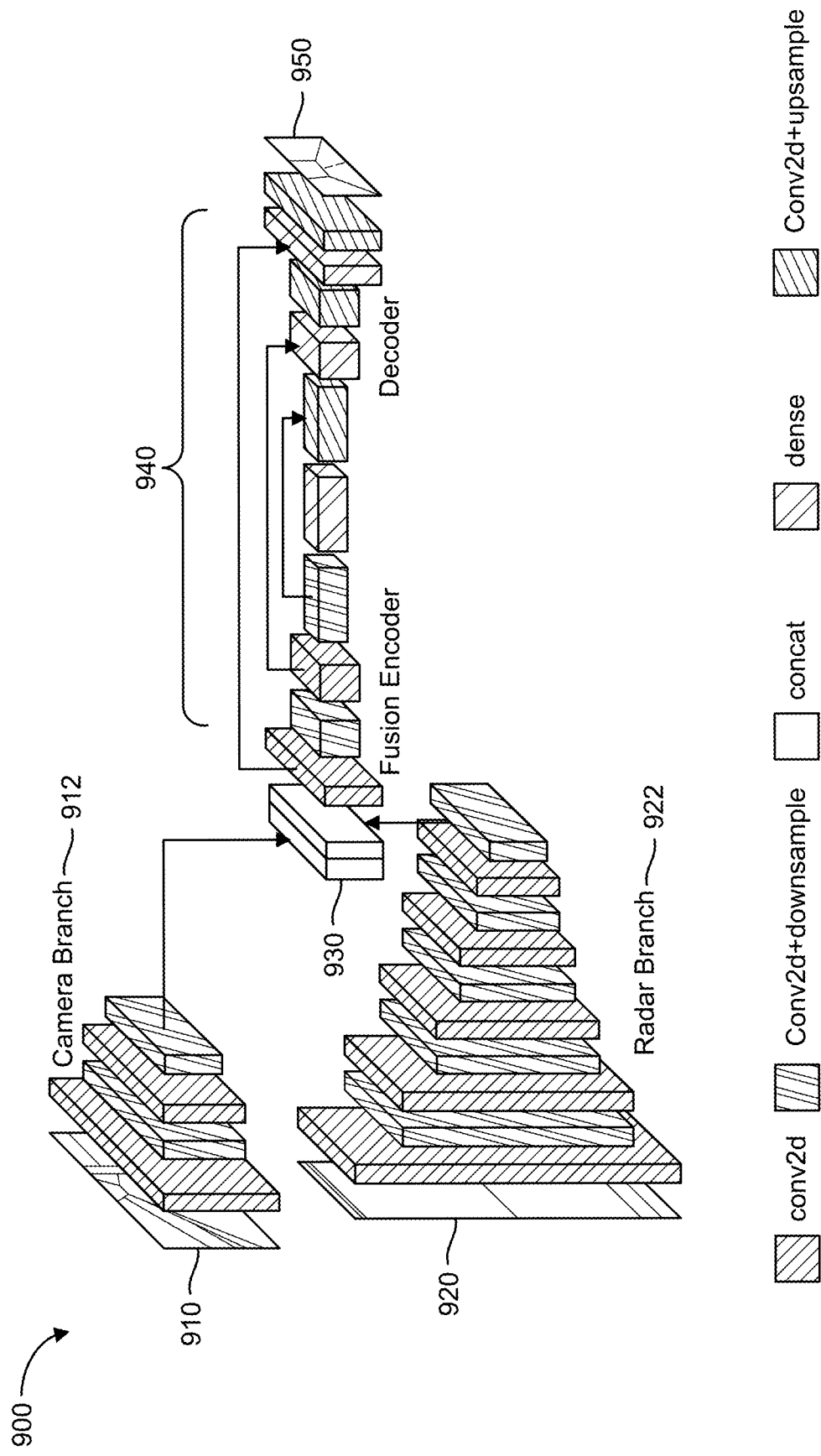
FIG. 9 illustrates an exemplary network architecture, according to aspects of the disclosure.

FIG. 9 illustrates an exemplary neural network architecture 900, according to aspects of the disclosure. The neural network architecture 900 is the architecture of an exemplary CNN. In the example of FIG. 9, the input images to the neural network architecture 900 are 64 by 256 pixels for the camera image 910 and 512 by 64 pixels for the radar image 920. The depth image 950 output is 16 by 64 pixels, to match the size of the LiDAR depth image described above.

The camera image 910 and the radar image 920 are first processed through separate network branches, camera branch 912 and radar branch 922, respectively, in which they are down-sampled (i.e., resampled to produce an approximation of the image that would have been obtained by originally sampling at a lower rate) progressively until their feature maps have the same dimension as the output depth image 950 (i.e., 16 by 64 in the example of FIG. 9). The camera branch 912 applies two down-sampling steps, each of which consists of a 3 by 3 convolutional layer with stride (1, 1) followed by a 3 by 3 convolutional layer with stride (2, 2). A convolution layer applies a convolution operation (a mathematical operation on two functions to produce a third function that expresses how the shape of one is modified by the other) to the input, passing the result to the next layer, and which emulates the response of an individual neuron to visual stimuli. Similarly, the radar branch 922 applies five down-sampling steps, each of which consists of a 3 by 1 convolutional layer with stride (1, 1) followed by a 3 by 3 convolutional layer with stride (2, 1). The number of feature maps at the output of each layer on the radar and camera branches 912 and 922 is kept fixed (e.g., at 32).

The outputted feature maps (e.g., 32 of 16 by 64 pixels) from each of the two sensor branches 912 and 922 are concatenated at 930 and then reduced from, for example, 64, back to, for example, 32 feature maps through a subsequent 3 by 3 convolutional layer. They are then passed through a fusion branch 940 in the form of an encoder-decoder network. The encoder-decoder network may be similar to U-Net (see O. Ronneberger, P. Fischer, and T. Brox, "U-Net: Convolutional networks for biomedical image segmentation," in Proc. MICCAI, pp. 234-241, October 2015). In the encoder part of the fusion branch 940, the feature maps are down-sampled two more times, each down-sampling step consisting of a 3 by 3 convolutional layer with stride (1, 1) followed by a 3 by 3 convolutional layer with stride (2, 2). The number of feature maps is doubled after every layer that down-samples the image. At the waist of the encoder-decoder network there are, for example, 128 feature maps, each of dimension, for example, 4 by 16. In the example of FIG. 9, these 8192 variables (128 by 4 by 16=8192) are used as inputs to a fully connected layer with, for example, 256 outputs, and are then passed through a 50% dropout layer, followed by another fully connected layer with 8192 output variables. These variables are then used to populate, for example, 128 feature maps of dimension, for example, 4 by 16 pixels, which form the input to the decoder part of the fusion branch 940. The use of fully connected and dropout layers helps the neural network architecture 900 to learn global features and to improve generalization, respectively.

The decoder part of the fusion branch 940 uses deconvolution and up-sampling layers (resampling to produce an approximation of the image that would have been obtained by originally sampling at a higher rate) mirroring the steps in the encoder part. Similar to U-Net, skip connections (implemented via tensor addition) are used from the encoder layers to the decoder layers to transmit higher frequency features.

Once trained on some number of camera and radar images, the neural network architecture 900 can be used to process camera images and radar images in real-time without reliance on corresponding LiDAR images. The processed images can be used in an autonomous vehicle's computer vision system to perform autonomous driving operations, such as lane changes, breaking, accelerating, etc.

Figure 10:
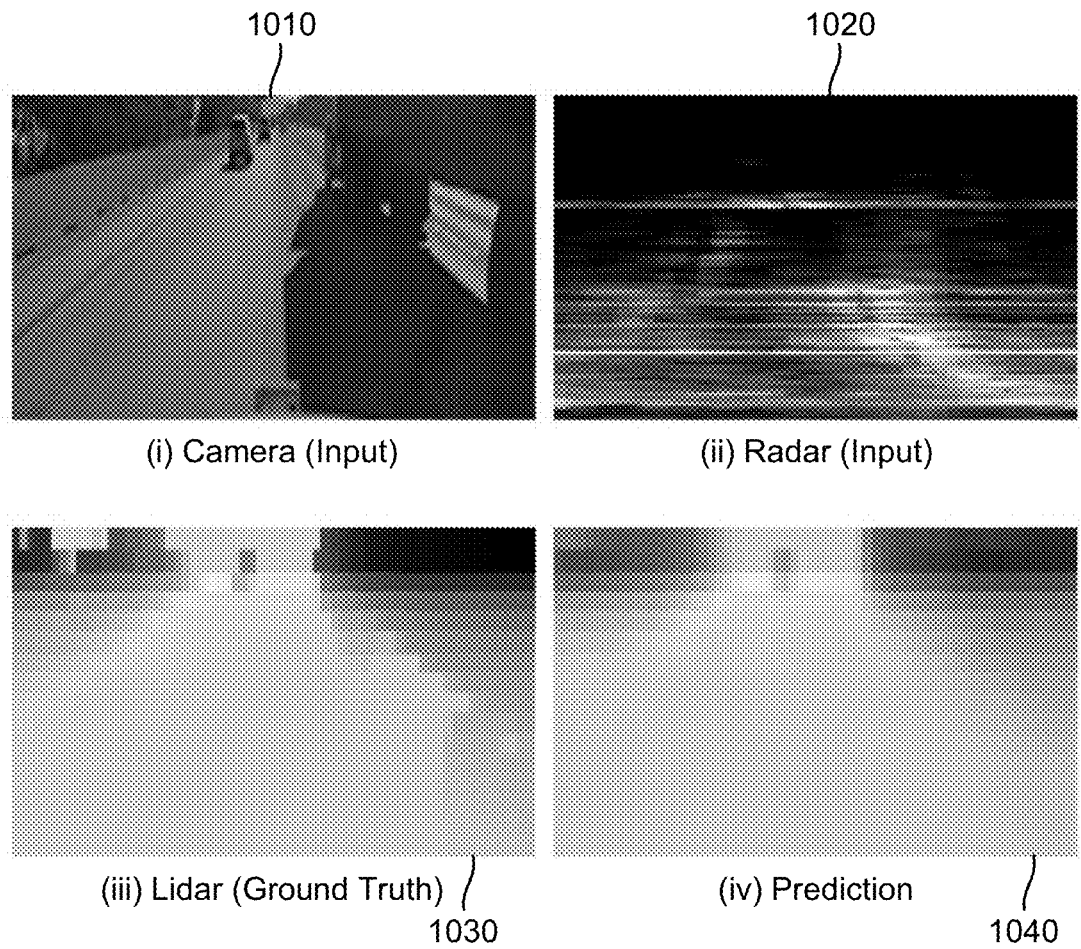
FIG. 10 illustrates a sample result of the network architecture, according to aspects of the disclosure.

FIG. 10 illustrates a sample result of the neural network architecture 900, according to aspects of the disclosure. The illustrated scene contains a concrete guard rail, a car, and a truck (from left to right). The sun is blocked by the truck, resulting in poor illumination of the truck and a pronounced shadow on the central lane. Both these effects are detrimental, and the depth reconstruction from the camera alone is quite poor in this scenario, as shown in camera image 1010. The radar sensor is unaffected by either of these effects, as shown in the radar image 1020, and with radar aiding, 3D depth reconstruction is successful, as shown in the depth image 1040. A LiDAR image 1030 provides the ground truth depth for the scene.

Figure 11:
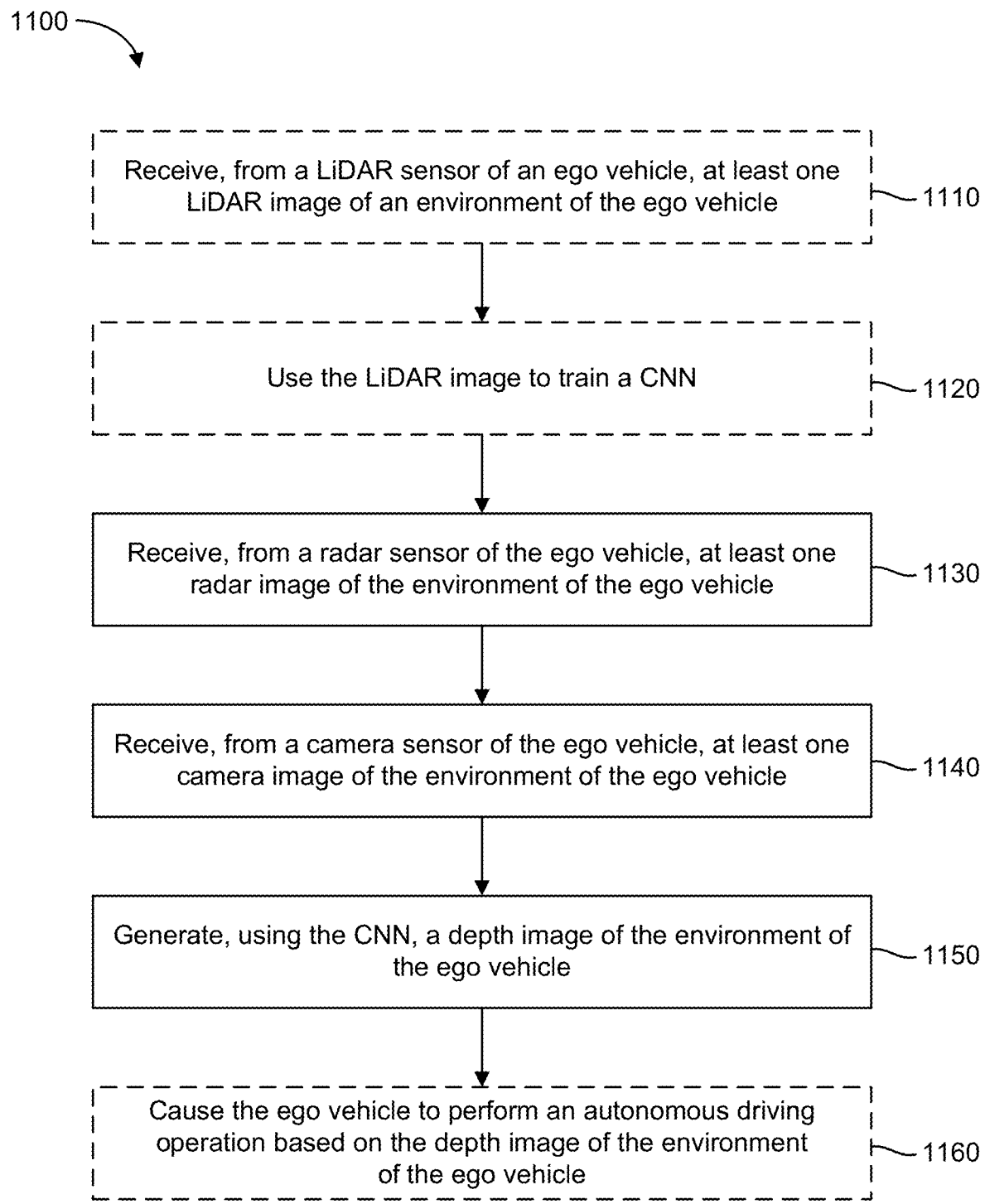
FIG. 11 illustrates an exemplary method for radar-aided single-image 3D depth reconstruction, according to aspects of the disclosure.

FIG. 11 illustrates an exemplary method 1100 for radar-aided single-image 3D depth reconstruction, according to aspects of the disclosure. In an aspect, the method 1100 may be performed by the processor(s) 206 of the OBC 200 in conjunction with the radar-camera sensor module 120. In an aspect, the camera sensor and the radar sensor may be collocated on the ego vehicle (e.g., vehicle 100). However, in an alternative aspect, the camera sensor and the radar sensor may not be collocated on the ego vehicle (e.g., as in the example of FIG. 8).

At 1110, the processor(s) 206 optionally receive, from a LiDAR sensor (e.g., LiDAR sensor 216) of the ego vehicle, at least one LiDAR image (e.g., LiDAR image 1030) of the environment of the ego vehicle. In an aspect, the LiDAR image represents range measurements of laser signals emitted by the LiDAR sensor. In an aspect, an azimuth axis of the at least one LiDAR image may be quantized into uniformly spaced azimuth angle bins and at least one depth value may be calculated for each of the uniformly spaced azimuth angle bins. In an aspect, an elevation axis of the at least one LiDAR image may be quantized into uniformly spaced elevation steps, and a depth value may be calculated for each pair of azimuth angle bins and elevation steps. In an aspect, the depth value of each of the uniformly spaced azimuth angle bins may be computed as an average range measurement of all range measurements falling in that azimuth angle bin.

At 1120, the processor(s) 206 optionally use the LiDAR image to train a CNN executed by the processor(s) 206. Stages 1110 and 1120 are optional because they need not be performed after the CNN is trained.

At 1130, the processor(s) 206 receive, from a radar sensor (e.g., radar 214) of the ego vehicle, at least one radar image (e.g., radar image 1020) of the environment of the ego vehicle. In an aspect, the radar sensor may be a commercially available electronically scanning radar (ESR), a short-range radar (SRR), a long-range radar, or a medium-range radar.

At 1140, the processor(s) 206 receive, from a camera sensor (e.g., camera 212) of the ego vehicle, at least one camera image (e.g., camera image 1010) of the environment of the ego vehicle. In an aspect, the camera sensor and the radar sensor may capture images at different frequencies, and the at least one camera image may be the nearest camera image in time to the at least one radar image.

At 1150, the processor(s) 206, using the CNN, generates a depth image (e.g., depth image 1040) of the environment of the ego vehicle based on the at least one radar image and the at least one camera image, as described above. In an aspect, the CNN may use an encoder-decoder network architecture, which may include a camera branch, a radar branch, a fusion encoder branch, and a decoder branch, as described above with reference to FIG. 9. In an aspect, as described above, the camera branch may generate at least one feature map representing the at least one camera image by down-sampling the at least one camera image until dimensions of the at least one feature map match dimensions of the depth image. The radar branch may generate at least one feature map representing the at least one radar image by down-sampling the at least one radar image until dimensions of the at least one feature map match dimensions of the depth image. The fusion encoder branch may combine the at least one feature map representing the at least one camera image and the at least one feature map representing the at least one radar image into at least one fused feature map. The decoder branch may then generate the depth image from the at least one fused feature map based on up-sampling the at least one fused feature map.

At 1160, the processor(s) optionally cause the ego vehicle to perform an autonomous driving operation based on the depth image of the environment of the ego vehicle. Stage 1160 is optional because the ego vehicle may not need to perform a driving operation based on the generated depth image. In an aspect, the autonomous driving operation may be one or more of displaying the depth image, detecting drivable space, path planning, braking, accelerating, steering, adjusting a cruise control setting, or signaling.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of radar-aided single-image three-dimensional (3D) depth reconstruction performed by at least one processor of an on-board computer of an ego vehicle, comprising:
   receiving, from a radar sensor of the ego vehicle, at least one radar image of an environment of the ego vehicle;
   receiving, from a camera sensor of the ego vehicle, at least one camera image of the environment of the ego vehicle;
   receiving, from a light detection and ranging (LiDAR) sensor of the ego vehicle, at least one LiDAR image of the environment of the ego vehicle, wherein the at least one LiDAR image represents range measurements of laser signals emitted by the LiDAR sensor;
   quantizing an azimuth axis of the at least one LiDAR image into a plurality of uniformly spaced azimuth angle bins;
   calculating at least one depth value for each azimuth angle bin of the plurality of uniformly spaced azimuth angle bins, wherein the depth value calculated for each of the uniformly spaced azimuth angle bins is computed as an average range measurement of all range measurements falling in that azimuth angle bin; and
   generating a depth image of the environment of the ego vehicle based on the at least one radar image, the at least one LiDAR image, the at least one depth value, and the at least one camera image.

2. The method of claim 1, further comprising:
   quantizing an elevation axis of the at least one LiDAR image into uniformly spaced elevation steps, and
   calculating at least one depth value for each pair of azimuth angle bins and elevation steps; and
   using the at least one depth value for each pair of azimuth angle bins and elevation steps for generating the depth image.

3. The method of claim 1, wherein:
   the camera sensor and the radar sensor are collocated on the ego vehicle.

4. The method of claim 1, wherein:
   the camera sensor and the radar sensor are not collocated on the ego vehicle.

5. The method of claim 1, wherein:
   the camera sensor and the radar sensor capture images at different frequencies, and wherein the at least one camera image is a nearest camera image in time to the at least one radar image.

6. The method of claim 1, wherein:
   the radar sensor comprises a commercially available electronically scanning radar (ESR), a short-range radar (SRR), a long-range radar, or a medium-range radar.

7. The method of claim 1, further comprising:
   causing the ego vehicle to perform an autonomous driving operation based on the depth image of the environment of the ego vehicle.

8. The method of claim 7, wherein:
   the autonomous driving operation is one or more of displaying the depth image, detecting drivable space, path planning, braking, accelerating, steering, adjusting a cruise control setting, or signaling.

9. An on-board computer of an ego vehicle, comprising:
   a memory; and
   at least one processor communicatively coupled to the memory, the at least one processor configured to:
      receive, from a radar sensor of the ego vehicle, at least one radar image of an environment of the ego vehicle;
      receive, from a camera sensor of the ego vehicle, at least one camera image of the environment of the ego vehicle;
      receive, from a light detection and ranging (LiDAR) sensor of the ego vehicle, at least one LiDAR image of the environment of the ego vehicle, wherein the at least one LiDAR image represents range measurements of laser signals emitted by the LiDAR sensor;
   quantize an azimuth axis of the at least one LiDAR image into a plurality of uniformly spaced azimuth angle bins;
      calculate at least one depth value for each azimuth angle bin of the plurality of uniformly spaced azimuth angle bins, wherein the at least one depth value calculated for each azimuth angle bin of the plurality of uniformly spaced azimuth angle bins is computed as an average range measurement of all range measurements falling in that azimuth angle bin; and
      generate a depth image of the environment of the ego vehicle based on the at least one radar image, the at least one LiDAR image, the at least one depth value, and the at least one camera image.

10. The on-board computer of claim 9, wherein the at least one processor is further configured to:
    quantize an elevation axis of the at least one LiDAR image into a plurality of uniformly spaced elevation steps;
    calculate at least one depth value for each pair of azimuth angle bins and elevation steps; and
    use the at least one depth value for each pair of azimuth angle bins and elevation steps to generate the depth image.

11. The on-board computer of claim 9, wherein:
    the camera sensor and the radar sensor are collocated on the ego vehicle.

12. The on-board computer of claim 9, wherein:
    the camera sensor and the radar sensor are not collocated on the ego vehicle.

13. The on-board computer of claim 9, wherein:
    the camera sensor and the radar sensor capture images at different frequencies, and wherein the at least one camera image is a nearest camera image in time to the at least one radar image.

14. The on-board computer of claim 9, wherein the at least one processor is further configured to:
    cause the ego vehicle to perform an autonomous driving operation based on the depth image of the environment of the ego vehicle.

15. The on-board computer of claim 14, wherein:
    the autonomous driving operation is one or more of displaying the depth image, detecting drivable space, path planning, braking, accelerating, steering, adjusting a cruise control setting, or signaling.

16. A non-transitory computer-readable medium storing computer-executable instructions for radar-aided single-image three-dimensional (3D) depth reconstruction, the computer-executable instructions comprising:
- at least one instruction instructing at least one processor of an on-board computer of an ego vehicle to receive, from a radar sensor of the ego vehicle, at least one radar image of an environment of the ego vehicle;
- at least one instruction instructing the at least one processor to receive, from a camera sensor of the ego vehicle, at least one camera image of the environment of the ego vehicle;
- at least one instruction instructing the at least one processor to receive, from a light detection and ranging (LiDAR) sensor of the ego vehicle, at least one LiDAR image of the environment of the ego vehicle, wherein the at least one LiDAR image represents range measurements of laser signals emitted by the LiDAR sensor;
- at least one instruction instructing the at least one processor to quantize an azimuth axis of the at least one LiDAR image into a plurality of uniformly spaced azimuth angle bins;
- at least one instruction instructing the at least one processor to calculate at least one depth value for each azimuth angle bin of the plurality of uniformly spaced azimuth angle bins, wherein the at least one depth value calculated for each azimuth angle bin of the plurality of uniformly spaced azimuth angle bins is computed as an average range measurement of all range measurements falling in that azimuth angle bin; and
- at least one instruction instructing the at least one processor to generate a depth image of the environment of the ego vehicle based on the at least one radar image, the at least one depth value, the at least one LiDAR image, and the at least one camera image.

* * * * *